(12) United States Patent
Murthy et al.

(10) Patent No.: US 8,356,053 B2
(45) Date of Patent: Jan. 15, 2013

(54) MANAGING RELATIONSHIPS BETWEEN RESOURCES STORED WITHIN A REPOSITORY

(75) Inventors: Ravi Murthy, Fremont, CA (US); Eric Sedlar, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1334 days.

(21) Appl. No.: 11/256,527

(22) Filed: Oct. 20, 2005

(65) Prior Publication Data

US 2007/0094286 A1 Apr. 26, 2007

(51) Int. Cl.
*G06F 17/30* (2006.01)
(52) U.S. Cl. ........................................ 707/781; 715/853
(58) Field of Classification Search .................. 707/101, 707/100, 781, 796; 715/853
See application file for complete search history.

(56) References Cited

U.S. PATENT DOCUMENTS

| | | | |
|---|---|---|---|
| 4,159,534 A * | 6/1979 | Getson et al. | 714/43 |
| 5,047,918 A | 9/1991 | Schwartz et al. | |
| 5,202,982 A | 4/1993 | Gramlich et al. | |
| 5,210,686 A | 5/1993 | Jernigan | |
| 5,257,366 A | 10/1993 | Adair et al. | |
| 5,295,256 A | 3/1994 | Bapat | |
| 5,303,379 A * | 4/1994 | Khoyi et al. | 717/166 |
| 5,307,490 A | 4/1994 | Davidson et al. | |
| 5,369,763 A | 11/1994 | Biles | |
| 5,388,257 A | 2/1995 | Bauer | |
| 5,410,691 A | 4/1995 | Taylor | |
| 5,454,101 A | 9/1995 | Mackay et al. | |
| 5,463,772 A | 10/1995 | Thompson et al. | |
| 5,467,471 A | 11/1995 | Bader | |
| 5,499,371 A | 3/1996 | Henninger et al. | |
| 5,504,892 A | 4/1996 | Atsatt et al. | |
| 5,524,240 A | 6/1996 | Barbara et al. | |
| 5,530,849 A | 6/1996 | Hanushevsky et al. | |

(Continued)

FOREIGN PATENT DOCUMENTS

EP 0 856 803 A2 8/1998

(Continued)

OTHER PUBLICATIONS

International Searching Authority, "Notification of Transmittal of the International Search Report and the Written Opinion of the International Searching Authority, or the Deceleration," PCT/US2006/039706, dated Feb. 22, 2007, 13 pages.

(Continued)

*Primary Examiner* — James Trujillo
*Assistant Examiner* — Dawaune Conyers
(74) *Attorney, Agent, or Firm* — Hickman Palermo Truong Becker Bingham Wong LLP

(57) ABSTRACT

A method and apparatus for managing relationships between resources stored in a repository is provided. A client sends, to a server, a request to store a first resource within a repository. In response to receiving the request, the server parses the first resource to retrieve relationship data that identifies a relationship between two or more resources to be stored, or currently stored, within the repository. The server stores, within a database accessible to the server, one or more relationship records that identify the relationship between the two or more resources. The one or more relationship records are stored separate from the two or more resources. Subsequently, the client may issue queries, to the server, about the one or more relationships records stored in the database. In this way, a user may access the one or more relationship records to analyze the relationship between resources stored in repository.

32 Claims, 5 Drawing Sheets

U.S. PATENT DOCUMENTS

| | | | |
|---|---|---|---|
| 5,544,360 A | 8/1996 | Lewak et al. | |
| 5,546,571 A | 8/1996 | Shan et al. | |
| 5,561,763 A | 10/1996 | Eto et al. | |
| 5,566,331 A | 10/1996 | Irwin, Jr. et al. | |
| 5,568,640 A | 10/1996 | Nishiyama et al. | |
| 5,574,915 A | 11/1996 | Lemon et al. | |
| 5,680,614 A | 10/1997 | Bakuya et al. | |
| 5,682,524 A | 10/1997 | Freund et al. | |
| 5,684,990 A | 11/1997 | Boothby | |
| 5,689,706 A | 11/1997 | Rao et al. | |
| 5,701,467 A | 12/1997 | Freeston | |
| 5,737,736 A | 4/1998 | Chang | |
| 5,758,153 A | 5/1998 | Atsatt et al. | |
| 5,778,179 A | 7/1998 | Kanai et al. | |
| 5,802,518 A | 9/1998 | Karaev et al. | |
| 5,819,275 A | 10/1998 | Badger et al. | |
| 5,822,511 A | 10/1998 | Kashyap et al. | |
| 5,825,353 A | 10/1998 | Will | |
| 5,832,526 A | 11/1998 | Schuyler | |
| 5,832,527 A * | 11/1998 | Kawaguchi | 707/205 |
| 5,838,965 A | 11/1998 | Kavanagh et al. | |
| 5,842,212 A | 11/1998 | Ballurio et al. | |
| 5,848,246 A | 12/1998 | Gish | |
| 5,878,415 A | 3/1999 | Olds | |
| 5,878,434 A | 3/1999 | Draper et al. | |
| 5,892,535 A | 4/1999 | Allen et al. | |
| 5,915,253 A | 6/1999 | Christiansen | |
| 5,917,492 A | 6/1999 | Bereiter et al. | |
| 5,918,225 A | 6/1999 | White et al. | |
| 5,921,582 A | 7/1999 | Gusack | |
| 5,937,406 A | 8/1999 | Balabine et al. | |
| 5,946,489 A * | 8/1999 | Yellin et al. | 717/147 |
| 5,974,407 A | 10/1999 | Sacks | |
| 5,978,791 A | 11/1999 | Farber et al. | |
| 5,991,771 A | 11/1999 | Falls et al. | |
| 5,999,942 A | 12/1999 | Talati | |
| 6,021,414 A | 2/2000 | Fuller | |
| 6,023,706 A | 2/2000 | Schmuck et al. | |
| 6,029,160 A | 2/2000 | Cabrera et al. | |
| 6,029,166 A | 2/2000 | Mutalik et al. | |
| 6,029,175 A | 2/2000 | Chow et al. | |
| 6,044,378 A * | 3/2000 | Gladney | 707/103 R |
| 6,052,122 A | 4/2000 | Sutcliffe et al. | |
| 6,088,694 A | 7/2000 | Burns et al. | |
| 6,092,086 A | 7/2000 | Martin et al. | |
| 6,101,500 A | 8/2000 | Lau | |
| 6,111,578 A | 8/2000 | Tesler | |
| 6,112,209 A | 8/2000 | Gusack | |
| 6,115,741 A | 9/2000 | Domenikos et al. | |
| 6,119,118 A | 9/2000 | Kain, III et al. | |
| 6,128,610 A | 10/2000 | Srinivasan | |
| 6,182,121 B1 | 1/2001 | Wlaschin | |
| 6,185,574 B1 | 2/2001 | Howard et al. | |
| 6,192,273 B1 | 2/2001 | Igel et al. | |
| 6,192,373 B1 | 2/2001 | Haegele | |
| 6,208,993 B1 | 3/2001 | Shadmon | |
| 6,212,512 B1 | 4/2001 | Barney et al. | |
| 6,212,557 B1 | 4/2001 | Oran | |
| 6,230,310 B1 | 5/2001 | Arrouye et al. | |
| 6,233,729 B1 | 5/2001 | Campara et al. | |
| 6,236,988 B1 | 5/2001 | Aldred | |
| 6,247,024 B1 | 6/2001 | Kincaid | |
| 6,279,007 B1 | 8/2001 | Uppala | |
| 6,301,605 B1 | 10/2001 | Napolitano et al. | |
| 6,314,408 B1 | 11/2001 | Salas et al. | |
| 6,321,219 B1 | 11/2001 | Gainer et al. | |
| 6,339,382 B1 | 1/2002 | Arbinger et al. | |
| 6,349,295 B1 | 2/2002 | Tedesco et al. | |
| 6,366,921 B1 | 4/2002 | Hansen et al. | |
| 6,366,988 B1 | 4/2002 | Skiba et al. | |
| 6,370,537 B1 | 4/2002 | Gilbert et al. | |
| 6,370,548 B1 | 4/2002 | Bauer et al. | |
| 6,389,427 B1 | 5/2002 | Faulkner | |
| 6,389,433 B1 | 5/2002 | Bolosky et al. | |
| 6,393,435 B1 | 5/2002 | Gartner et al. | |
| 6,393,456 B1 | 5/2002 | Ambler et al. | |
| 6,397,231 B1 | 5/2002 | Salisbury et al. | |
| 6,421,692 B1 | 7/2002 | Milne et al. | |
| 6,438,550 B1 | 8/2002 | Doyle et al. | |
| 6,442,548 B1 | 8/2002 | Balabine et al. | |
| 6,446,091 B1 | 9/2002 | Noren et al. | |
| 6,457,007 B1 | 9/2002 | Kikuchi et al. | |
| 6,457,065 B1 | 9/2002 | Rich et al. | |
| 6,487,469 B1 | 11/2002 | Formenti | |
| 6,493,742 B1 | 12/2002 | Holland et al. | |
| 6,532,488 B1 | 3/2003 | Ciarlante et al. | |
| 6,587,873 B1 | 7/2003 | Nobakht et al. | |
| 6,594,675 B1 | 7/2003 | Schneider | |
| 6,604,100 B1 | 8/2003 | Fernandez et al. | |
| 6,611,843 B1 | 8/2003 | Jacobs | |
| 6,636,845 B2 | 10/2003 | Chau et al. | |
| 6,681,221 B1 | 1/2004 | Jacobs | |
| 6,684,222 B1 * | 1/2004 | Cornelius et al. | 707/104.1 |
| 6,725,212 B2 | 4/2004 | Couch et al. | |
| 6,959,416 B2 | 10/2005 | Manning et al. | |
| 7,043,472 B2 | 5/2006 | Aridor et al. | |
| 7,072,896 B2 * | 7/2006 | Lee et al. | 707/101 |
| 7,103,915 B2 | 9/2006 | Redlich et al. | |
| 7,117,216 B2 | 10/2006 | Chakraborty | |
| 7,139,974 B1 * | 11/2006 | Bascom et al. | 715/513 |
| 7,280,995 B1 | 10/2007 | Sedlar | |
| 7,281,206 B2 | 10/2007 | Schnelle et al. | |
| 7,366,735 B2 | 4/2008 | Chandrasekar et al. | |
| 7,433,870 B2 | 10/2008 | Chan et al. | |
| 7,461,074 B2 | 12/2008 | Murthy et al. | |
| 7,610,315 B2 | 10/2009 | Chang et al. | |
| 7,711,702 B2 | 5/2010 | Smolen et al. | |
| 2002/0056025 A1 | 5/2002 | Qiu et al. | |
| 2002/0073056 A1 | 6/2002 | Broster et al. | |
| 2002/0091734 A1 | 7/2002 | Redlich et al. | |
| 2002/0120648 A1 | 8/2002 | Ball et al. | |
| 2002/0133484 A1 | 9/2002 | Chau et al. | |
| 2002/0184401 A1 | 12/2002 | Kadel, Jr. et al. | |
| 2002/0188638 A1 | 12/2002 | Hamscher | |
| 2003/0004937 A1 | 1/2003 | Salmenkaita et al. | |
| 2003/0014384 A1 | 1/2003 | Ewald et al. | |
| 2003/0025728 A1 * | 2/2003 | Ebbo et al. | 345/744 |
| 2003/0033285 A1 | 2/2003 | Jalali et al. | |
| 2003/0065659 A1 | 4/2003 | Agarwal et al. | |
| 2003/0084056 A1 | 5/2003 | DeAnna et al. | |
| 2003/0101194 A1 | 5/2003 | Rys et al. | |
| 2003/0177443 A1 | 9/2003 | Schnelle et al. | |
| 2003/0195865 A1 | 10/2003 | Long et al. | |
| 2003/0200197 A1 | 10/2003 | Long et al. | |
| 2004/0043758 A1 | 3/2004 | Sorvari et al. | |
| 2004/0064387 A1 * | 4/2004 | Clarke et al. | 705/34 |
| 2004/0064466 A1 | 4/2004 | Manikutty et al. | |
| 2004/0068509 A1 | 4/2004 | Garden et al. | |
| 2004/0068696 A1 | 4/2004 | Seyrat et al. | |
| 2004/0103282 A1 | 5/2004 | Meier et al. | |
| 2004/0143791 A1 | 7/2004 | Ito et al. | |
| 2004/0176958 A1 | 9/2004 | Salmenkaita et al. | |
| 2004/0225680 A1 | 11/2004 | Cameron et al. | |
| 2004/0237035 A1 | 11/2004 | Cummins | |
| 2004/0268023 A1 | 12/2004 | Hogg et al. | |
| 2005/0022157 A1 * | 1/2005 | Brendle et al. | 717/104 |
| 2005/0076030 A1 | 4/2005 | Hada et al. | |
| 2005/0131926 A1 | 6/2005 | Chakraborty et al. | |
| 2005/0278289 A1 | 12/2005 | Gauweiler et al. | |
| 2005/0278616 A1 | 12/2005 | Eller | |
| 2006/0004780 A1 | 1/2006 | Maeda et al. | |
| 2006/0143177 A1 | 6/2006 | Idicula et al. | |
| 2006/0143557 A1 | 6/2006 | Chan et al. | |
| 2006/0143558 A1 | 6/2006 | Albornoz et al. | |
| 2006/0168513 A1 | 7/2006 | Coulson et al. | |
| 2006/0212467 A1 | 9/2006 | Murthy et al. | |
| 2006/0259854 A1 | 11/2006 | Walker et al. | |
| 2007/0044012 A1 | 2/2007 | Suver et al. | |
| 2007/0150809 A1 | 6/2007 | Yoshida | |
| 2008/0021916 A1 | 1/2008 | Schnelle et al. | |
| 2008/0072141 A1 | 3/2008 | Hodel-Widmer | |
| 2008/0077606 A1 | 3/2008 | Fang et al. | |
| 2008/0319999 A1 | 12/2008 | Simpson et al. | |
| 2009/0070295 A1 | 3/2009 | Otomori et al. | |

FOREIGN PATENT DOCUMENTS

| WO | WO 97/46956 A1 | 12/1997 |
| --- | --- | --- |
| WO | WO 00/14632 A1 | 3/2000 |
| WO | WO 00/49533 A2 | 8/2000 |
| WO | WO 01/59602 A1 | 8/2001 |
| WO | WO 01/61566 A1 | 8/2001 |

OTHER PUBLICATIONS

Current Claims PCT/US2006/039706, 4 pages.

Arnold-Moore, Tim et al., "Architecture of a Content Management Server for XML Document Application," Web information Systems Engineering 2000, IEEE Computer Society—vol. 1, Jun. 19, 2000, XP010521842, pp. 97-108.

Sato, Hiroyuki et al., "Hyperclip: A Tool for Gathering and Sharing Meta-Data on User's Activities by Using Peer-to-Peer Technology," NTT Corporation—May 2002, retrieved from the internet at http://www.cs.rutgers.edu/{shklar/www11/final-submissions/paper12.pdf, retrieved on Jan. 29, 2007, 5 pages.

Wilde, Erik et al., "From Content-centered Publishing to a Link-based View of Information Resources," Proceedings of the 33rd Annual Hawaii International Conference—Jan. 4-7, 2000, XP010545318, pp. 1-10.

Wollschlaeger, Martin et al., "XML based Description Model as a Platform for Web-based Maintenance," Industrial Informatics Conference 2004, XP010782616, pp. 125-130.

Al-Khalifa, Shurug et al., "Structural Joins: A Primitive for Efficient XML Query Pattern Matching", Feb. 26-Mar. 1, 2002, Data Engineering, 2002. Proceedings. 18th International Conference, pp. 141-152.

Bourret, R. et al., "A Generic Load/Extract Utility for Data Transfer Between XML Documents and Relational Databases," Proc. Second International Workshop on Advanced issues of E-Commerce and Web-Based Information Systems, IEEE Computing Society, Jun. 8-9, 2000, pp. 134-143.

Braga, Daniele et al., "A Graphical Environment to Query XML Data with Query," Proceedings of the Fourth International Conference on Web Information Systems Engineering (WISE '03), 2003, IEEE, 10 pages.

Chae, Mi-Ok et al., "Design and Itnplementation of an Object-Oriented Multimedia DBMS Tightly Coupled with Information Retrieval Functions," Proc. 17th IASTED International Conference on Applied Informatics, Feb. 15-18, 1999, abstract.

Chakraborty, Krishnendu, "The XML Garbage Collector", The Source for Developers, Sun Developer Network Site XP-002297849, Mar. 2002, [online], retrieved Apr. 14, 2005, retrieved from the internet: <URL: http://developers.sun.com/solaris/articles/xml_garbage_collector.html>, pp. 1-6.

Chen, Ruey-Shun et al., "Developing an XML framework for metadata system", Trinity College Dublin, Proc. of the 1st Inter. Sympo. on Information and Communication, pp. 267-272.

Cheng, Josephine et al., "IBM DB2 XML Extender," IEEE, ICDE '00 Conference, San Diego, Feb. 2000, 139 pages.

Jajodia, Sushil et al., "Toward a Multilevel Secure Relational Data Model," ACM, 1991, 8393 SIGMOD Record, Jun. 20, 1991, No. 2, New York, US, XP 000364619, pp. 50-59.

Manolescu, Dragos, Review of "Metadata solutions: using metamodels, repositories, XML, and enterprise portals to generate information on demand by Adrienne Tannebaum", Mar. 2003, ACM Press, vol. 28, Issue 2, p. 38.

Noser, Hansrudi et al., Dynamic 3D Visualization of Database-Defined Tree Structures on the WWW by Using Rewriting Systems, 2000, IEEE, XP-002262516, pp. 247-254.

Oracle Corporation, "Oracle® iFS (Internet File System," Technical Data Sheet, Mar. 1999, XP-002204710, pp. 1-3.

Rao, Herman Chung-Hwa et al., "An Overview of the Internet File System," 1997, IEEE, XP-002204711, pp. 474-477.

Ricardo, Catherine, Database Systems: Principles, Design, & Implementation, 1990, MacMillian Publishing co., pp. 357-361, 379-380.

Vorthmann, Scott et al. "Beyond Schemas, Schema Adjuncts and the Outside World," Markup Languages, Online!, vol. 2, No. 3, Jun. 2000, pp. 1-8.

Written Opinion, Application No. PCT/US03/35551 (8 pages).

Current claims in PCT/US03/35551, pp. 20-23.

U.S. Appl. No. 11/601,116, filed Nov. 16, 2006.
U.S. Appl. No. 11/716,462, filed Mar. 8, 2007.
U.S. Appl. No. 11/716,190, filed Mar. 8, 2007.
U.S. Appl. No. 11/716,010, filed Mar. 8, 2007.
U.S. Appl. No. 11/716,107, filed Mar. 8, 2007.
U.S. Appl. No. 11/716,126, filed Mar. 8, 2007.

Madore, David, "GCFS: a Garbage-Collected Filesystem for Linux", Feb. 2000, 15 pages.

Mellande, "Unix File system Security", Jun. 2002, 26 pages.

Callaghan, et al., "NFS Version 3 Protocol Specification", RFC 1813, Jun. 1995, 93 pages.

Wilde et al., "From Content-centered Publishing to a Link-based view of Information Resources", Proceedings of the 33rd Hawaii International Conference on System Sciences, dated 2000, 10 pages.

W3C XML Inclusions (XInclude) Version 1.0 (Second Edition); W3C Recommendation Nov. 15, 2006; W3C XML Inclusion-XInclude.pdf, retrieved from the Internet Jul. 12, 2011, 24 pages.

Jirka Kosek and Petr Nalevska (2006), Relaxed—On the Way Towards True Validation of Compound Documents, pp. 427-436.

* cited by examiner

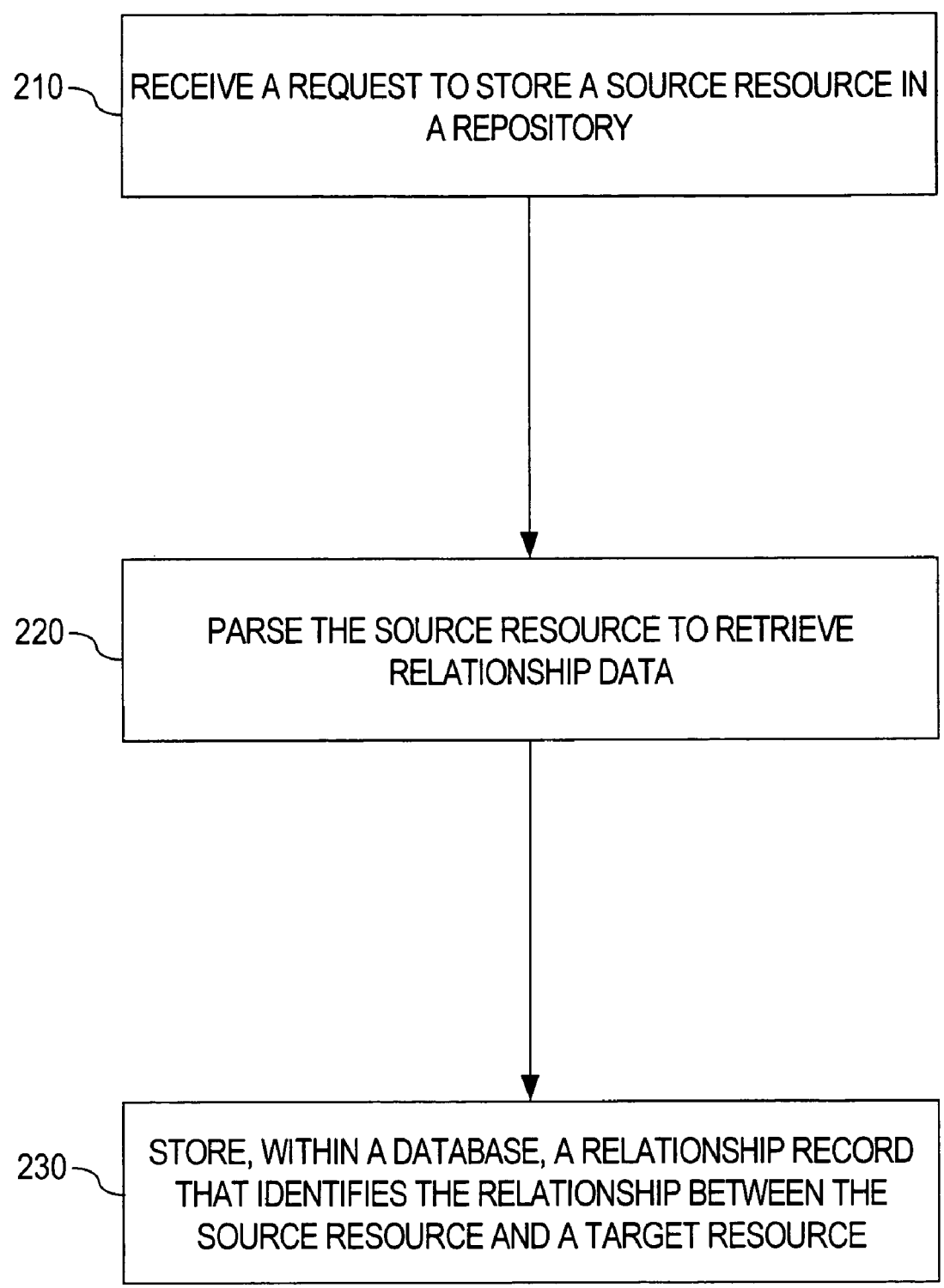

FIG. 3

Exemplary Schema of an Element of a Resource Configuration

```
<element name ="XLinkConfig">
  <complexType><sequence>
    <element name ="LinkType">
      <simpleType>
        <restriction base ="String">
          <enumeration value = "None"/>
          <enumeration value = "Hard"/>           302
          <enumeration value = "Weak"/>
          <enumeration value = "Symbolic"/>
        </restriction>
      </simpleType>
    </element>
    <element name ="PathFormat">
      <simpleType>
        <restriction base ="string">
          <enumeration value = "identifier"/>     304
          <enumeration value = "path"/>
        </restriction>
      </simpleType>
    </element>
</element>
```

300

MANAGING RELATIONSHIPS BETWEEN RESOURCES STORED WITHIN A REPOSITORY

RELATED APPLICATION DATA

This application is related to U.S. patent application Ser. No. 11/014,442, entitled "A Comprehensive Framework to Integrate Business Logic into a Repository," filed on Dec. 15, 2004, referred to herein as the "the framework patent application," which is incorporated by reference as if fully set forth herein.

FIELD OF THE INVENTION

Embodiments of the present invention relate to managing the relationships between resources stored in a repository.

BACKGROUND

A digital resource (or simply a "resource"), as broadly used herein, refers to any unit of digital data stored as an individual entity. Non-limiting, illustrative examples of a resource include a document, an image, a folder, and a file.

Resources may have different types of relationships with each other. In some cases, the relationship between two resources may be identified by one of the resources. For example, a first web page may have a relationship with a second web page because the first web page includes a web link to the second web page. Thus, when a user selects the web link on the first web page, the second web page is displayed to the user.

In other cases, the relationship between two resources may not be identified by either of the two resources. For example, a thumbnail image has a relationship with the original image to which the thumbnail corresponds because both the thumbnail image and the original image depict the same image. However, while both the thumbnail image and the original image depict the same image, there is no indication in either of the thumbnail image or the original image of the existence of the other. As another example, a first text document may have a relationship with a second text document because the content of the first text document includes the content of a second text document. However, the first text document may not identify the existence of the second text document.

Resource management applications are increasingly being used to store resources that are expressed in a self-describing metalanguage, such as the extensible markup language (XML). XML is a language that allows a resource to be defined as a tree of elements. XML is a markup language that allows tagging of document elements and provides for the definition, transmission, validation, and interpretation of data between applications and between organizations.

While XML has been used to describe the contents of a resource, current techniques in the art do not adequately provide for managing the relationships between resources stored in a repository. Consequently, an approach for managing the relationships between resources stored in a repository is desirable. The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIG. 2A is a flowchart illustrating the functional steps of storing a source resource within the repository according to an embodiment of the invention;

FIG. 3 is a graphical depiction of a schema for an element of a resource configuration according to an embodiment of the invention.

DETAILED DESCRIPTION

In the following description, for the purposes of explanation, numerous specific details are set forth in order to provide a thorough understanding of the embodiments of the present invention described herein. It will be apparent, however, that the embodiments of the present invention described herein may be practiced without these specific details. In other instances, well-known structures and devices are shown in block diagram form in order to avoid unnecessarily obscuring the embodiments of the present invention described herein.

Functional Overview

Approaches are presented herein for managing the relationship between resources stored in a repository. According to a first embodiment, a client sends, to a server, a request to store a first resource. In response to receiving the request, the server parses the first resource to retrieve relationship data that identifies a relationship between the first resource and a second resource in a repository accessible to the server. The relationship data may be expressed in the first resource by a variety of ways, e.g., the relationship data may be expressed using an XML linking language (XLink). Version 1.0 of the XLink specification (the "XLink specification") is available from the W3C consortium, and is incorporated by reference as if fully set forth herein. The server stores, within a database accessible to the server, one or more relationship records that identify the relationship between the first resource and the second resource. The one or more relationship records are stored separate from the first resource. Subsequently, the client may issue queries, to the server, about the one or more relationships records stored in the database. In this way, a user may access the one or more relationship records to analyze the relationship between resources stored within the repository.

In another embodiment, a first resource and a second resource are stored within a repository. Neither the first resource nor the second resource contains any link to the other. In response to a server receiving a request, from a client to store a third resource ("a relationship-identifying resource") in a repository accessible to the server, the server parses the relationship-identifying resource to retrieve relationship data that identifies a relationship between the first resource and the second resource. The relationship data may be, but need not be, expressed within the relationship-identifying resource using XLink. The server stores, within a database accessible to the server and separately from the first resource, one or more relationship records that indicate the existence of a link from the first resource to the second resource. In this way the client may subsequently issue queries to the server about the one or more relationships records stored in the database, even though neither the first resource nor the second resource contains any link to the other.

Architecture Overview

Figure 1:
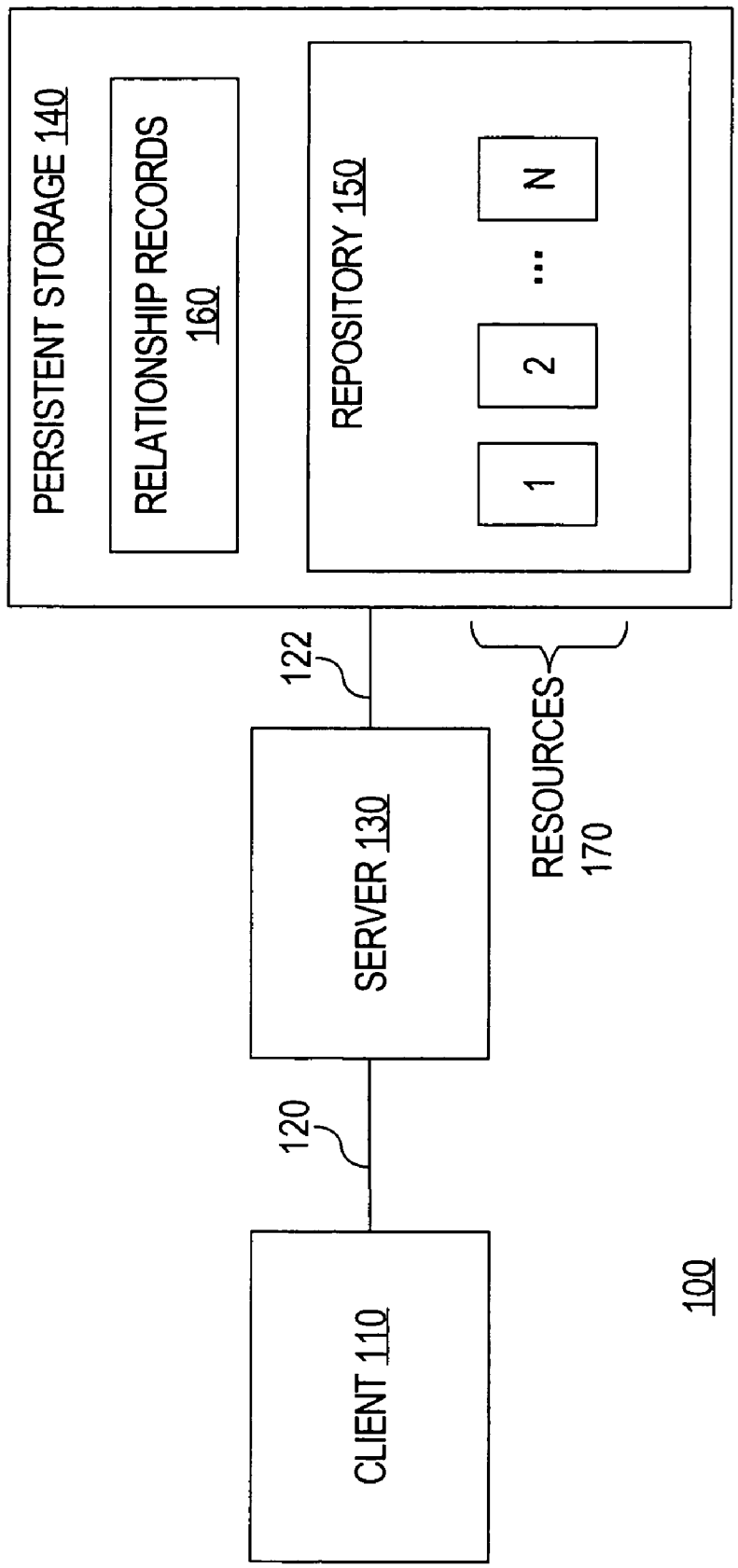
FIG. 1 is a graphical depiction of a system according to an embodiment of the invention.

FIG. 1 is a graphical depiction of a system 100 according to an embodiment of the invention. The system 100 of FIG. 1 may be used to manage the relationships between resources stored in a repository. According to the embodiment depicted in FIG. 1, system 100 comprises a client 110, communications links 120 and 122, server 130, persistent storage 140, repository 150, one or more relationship records 160, and one or more resources 170. System 100 of FIG. 1 is merely illustrative; other embodiments of the invention may employ different components than those depicted in FIG. 1.

A client 110 may be implemented by any medium or mechanism that provides for issuing a request to store a resource in repository 150. For example, a user may use client 110 for storing and retrieving resources to and from repository 150. Non-limiting, illustrative examples of client 110 include a web browser, a wireless device, a cell phone, a personal computer, and a software application.

Communications link 120 may be implemented by any medium or mechanism that provides for the exchange of data between client 110 and server 130. Communications link 122 may be implemented by any medium or mechanism that provides for the exchange of data between server 130 and persistent storage 140. Examples of communications links 120 and 122 include, without limitation, a network such as a Local Area Network (LAN), Wide Area Network (WAN), Ethernet or the Internet, or one or more terrestrial, satellite or wireless links.

Server 130 may be implemented by any medium or mechanism that provides for receiving and processing requests from client 110. For example, server 130 may process a request, received from client 110, to store a resource in repository 150. Non-limiting, illustrative examples of server 130 include a database server or any server capable of issuing commands to persistent storage 140.

Persistent storage 140 may be implemented by any medium or mechanism that provides for persistently storing relationship records. A non-limiting, illustrative example of persistent storage 140 includes a database. In the embodiment depicted in FIG. 1, persistent storage 140 implements repository 150. In other embodiments (not shown in FIG. 1), repository 150 is not implemented by persistent storage 140, and the repository 150 is separate and distinct from the persistent storage 140.

Persistent storage 140 may be used to store one or more relationship records 160. A relationship record is a record that describes a relationship between two or more resources stored in repository 150. For example, in an embodiment, a relationship record may be embodied as one or more rows of one or more tables of persistent storage 140. A particular relationship record may describe the type of relationship between two or more resources, information that identifies the resources involved in the relationship, and any other information about how the relationship, such as how to identify, to client 110, the resources involved in the relationship.

Repository 150 may be implemented by any medium or mechanism that provides for implementing a file system. Repository 150 may provide a hierarchy of folders in which resources may be stored. Non-limiting, illustrative examples of repository 150 include a NFS file repository.

Repository 150 may be used to store one or more resources 170. A resource, as used herein, refers to any unit of digital data stored as an individual entity. Non-limiting, illustrative examples of a resource include a document, an image, a folder, and a file.

Having described an illustrative system 100 according to an embodiment, approaches for identifying the relationship between resources 170 stored in repository 150 shall be discussed.

Identifying a Relationship Between a Source Resource and a Target Resource Using Relationship Data For ease of explanation, several embodiments of the invention shall be discussed herein with reference to a first resource (denoted a source resource) that has a relationship to a second resource (denoted a target resource). Embodiments of the invention may manage relationships involving any number of resources; however, for purposes of providing a clear example, several embodiments will be presented with reference to a source resource that has a link to a target resource. A relationship between a source resource and a target resource may be identified to system 100 by information (denoted relationship data) stored in the source resource. Alternately, the relationship data may be stored in a different resource (denoted a relationship-identifying resource) other than source resource or the target resource.

Relationship-identifying resources are particularly useful when the source resource involved in the relationship cannot carry the relationship data. For example, a thumbnail has a particular relationship with the original image upon which the thumbnail image is based. However, the thumbnail image file cannot easily be modified to carry the relationship data without affecting the way in which the thumbnail image is rendered. Consequently, it may be advantageous to store the relationship data in a relationship-identifying resource, instead of the thumbnail image file itself.

Relationship data may be identified within the source resource or the relationship-identifying resource using a defined syntax for expressing the relationship data. For example, according to one embodiment, an XML linking language, such as XLink, may be employed to express the relationship data. XLink is a language that allows elements to be inserted into XML documents in order to create and describe relationships between resources.

Several embodiments shall be described herein with reference to XLink identifying relationship data within a source resource or a relationship-identifying resource; however, the use of XLink to identify the relationship data within a resource is merely exemplary of one embodiment, as other embodiments of the invention may use other syntaxes for identifying relationship data within a source resource or a relationship-identifying resource.

The Nature of Relationships Between Resources

Relationship data may identify a variety of different relationships between resources 170. For example, a first resource may have either an intra-resource or an inter-resource relationship with a second resource. An intra-resource relationship is a relationship wherein a source resource is composed of one or more target resources. On the other hand, an inter-resource relationship is a relationship wherein a first resource has an implicit or explicit relationship with one or more target resources, where the one or more target resources does not form part of the source resource.

To provide an example of an intra-resource relationship, a large document may be composed of two or more smaller documents. Separate parties may manage each of the smaller documents. Also, certain resources may be designed to be incorporated in many other resources, e.g., a boilerplate document (such as a warranty disclaimer or copyright notice) may be incorporated into numerous other documents. As the boilerplate document is likely to be stored separately from the documents that incorporate the boilerplate document, it would be advantageous to use system 100 to manage the relationships between the boilerplate document and those documents that incorporate the boilerplate document. In this way, system 100 may be used, as described in greater detail below, to prevent the boilerplate document from being accidentally deleted. Also, system 100 may be used to determine all the documents within the repository 150 that incorporate the boilerplate document.

To provide an example of an implicit inter-resource relation, a source resource may be a thumbnail image. While the thumbnail image is a smaller version of an original image, there is no indication in either of the thumbnail image or the original image about the existence of the other. Thus, the thumbnail image has a relationship to the original image, even though there is no express indication in the thumbnail image that the original image depicts the same image as the thumbnail image.

To provide an example of an explicit inter-resource relationship, a resource may contain data that identifies another resource. For example, a web page may include a link, specified using a Universal Resource Locator (URL), to one or more other target resources stored in the repository 150. As a further example of an explicit inter-resource relationship, a source resource may contain a link to a particular folder of repository 150.

The above description of exemplary relationships that may exist between resources 170 are not intended to limit the types of relationships that may be described by relationship data or relationship records 160, as relationship data and relationship records 160 may be used to describe a variety of relationships too numerous to fully enumerate herein.

Having described the types of relationships that may exist between resources 170, additional details about how those relationships are described by the relationship records 160 are presented below.

Hard, Weak, and Symbolic Links

Information about the relationships between resources 170 are recorded in the relationship records 160 that are stored in the persistent storage 140. A particular relationship record may model a relationship between two or more resources 170 using a type of link between the two or more resources 170. Several examples of the types of links that may be identified by relationship records include a hard link, a weak link, and a symbolic link. The description of hard links, weak links, and symbolic links which follows is not meant to fully enumerate the type of links which may be identified by the relationship records 160, as relationship records 160 may be used to identify any type of link between a source resource and a target resource.

When a source resource has a hard link to a target resource, the target resource is uniquely identified, to repository 150, by the hard link. For example, the particular relationship record establishing the hard link may include a target resource identifier assigned to the target resource by the repository 150. Thus, if the target resource were to move to another location within the repository 150, the hard link between the source resource and the target resource would be preserved because the target resource is uniquely identified, within the repository 150, by the target resource identifier. In an embodiment where the repository 150 is implemented in persistent storage 140, the persistent storage 140 may assign the target resource identifier. For example, if the persistent storage 140 is a database, then the database may assign an object identifier to uniquely identify the target resource. In this way, regardless of where the target resource is moved to within the repository 150, the database may identity the target resource using the object identifier.

In addition, a hard link guarantees the integrity of the link. In other words, a target resource cannot be deleted from the repository 150 if any other resource, within the repository 150, has a hard link to the target resource. In this way, a hard link may be used to prevent the accidental deletion of a target resource that has a hard link to the target resource.

Similar to a hard link, when a source resource has a weak link to a target resource, the target resource is uniquely identified by the weak link. For example, the particular relationship record establishing a particular weak link may also include a target resource identifier assigned to the target resource by the repository 150. However, unlike a hard link, a weak link does not guarantee the integrity of the link. Thus, a weak link does not prevent a target resource from being deleted from the repository 150 if another resource, stored within the repository 150, has a weak link to the target resource.

Because a target resource that has a hard link to it cannot be deleted from the repository 150, the system 100 may be configured to require a certain permission level to add a hard link to a target resource. However, even if a user does not have a sufficient permission level to add a hard link to a target resource, the user may still wish to uniquely identify the target resource with the repository 150 so that the link is preserved if the target resource is moved to a different location within the repository 150. In such a case, using a weak link may be advantageous.

When a source resource has a symbolic link to a target resource, the symbolic link does not uniquely identify the target resource within the repository 150, but rather, the symbolic link identifies a location, within the repository 150, at which the target resource resides. Thus, if the target resource is moved to a different location within the repository 150, the symbolic link will no longer point to the target resource. However, if a new target resource is moved to the location identified by the symbolic link, then the symbolic link will point to the new target resource. Symbolic links may identify a location within the repository 150 by identifying a particular path, within the repository 150, to the location at which the target resource resides.

The paths to target resources, identified by symbolic links, are resolved when the symbolic link is accessed. Thus, a symbolic link may be useful when a resource wishes to maintain a link to a specific location within the repository 150, rather than linking to a specific resource within the repository. For example, there may exist seven folders in the repository 150 which correspond to the seven days of the week. Six of the seven folders are stored at a first location, and the folder that corresponds to the current day is stored at a second location. At the end of each day, the folder corresponding to the current day may be moved back to the first location, and the folder corresponding to the new day may be moved from the first location to the second location. Updates are made to the folder corresponding to the current day. In this way, a rolling archive of the week's activity may be performed. If a resource wishes to link to the folder corresponding to the current day, the intent is to link the resource to whichever folder happens to correspond to the current day, rather than linking to a specific folder. Thus, a symbolic link may be used in this situation to link a resource to the folder occupying the second location (the location where the folder for the current day is stored).

Additionally, symbolic links may be employed when it is desirable to link a resource to another resource that is stored outside of repository 150. Since a target resource identifier cannot be assigned by the repository 150 to a resource that is not maintained by the repository 150, a symbolic link may be used to describe this relationship. For example, the repository 150 may register a callback function to access a resource stored outside of repository 150. In this way, the symbolic link may reference and make use of the callback function to identify a location, where the target resource may be stored, outside of repository 150. Symbolic links also do not guarantee the integrity of the link. Thus, a symbolic link does not prevent a target resource from being deleted from the repository 150 if other resources stored within the repository 150 have a symbolic link to the target resource.

While embodiments of the invention shall chiefly be described with reference to a single source resource that has a relationship to a single target resource, a single resource may have a relationship with two or more resources. Accordingly, relationship data stored within a source resource or a relationship-identifying resource may identify that a source resource has a relationship with two or more target resources.

Having described several examples of the different types of relationships that may be identified by relationship data within a source resource or relationship-identifying resource, an approach for storing resources within the repository, according to embodiments of the invention, shall now be described.

Storing a Source Resource within the Repository

FIG. 2A is a flowchart illustrating the functional steps of storing a source resource within the repository 150 according to an embodiment of the invention. The functional steps of FIG. 2A shall be explained below with reference to FIG. 1.

In step 210, a request to store a source resource in repository 150 is received by server 130. The request of step 210 may be sent by client 110 over communications link 120 to server 130. As described above, a source resource is a resource that which has a relationship to a target resource. A source resource may contain relationship data identifying the relationship the source resource has to the target resource. For example, a source resource may be a document that contains the relationship data expressed using XLink. After the request to store a source resource in repository 150 is received, processing proceeds to step 220.

In step 220, server 130 parses the source resource to retrieve relationship data from the source resource. For example, the server 130 may parse the source data to retrieve the relationship data from an XLink embedded within the source resource. Relationship data may be expressed in a variety of different formats within a source resource; as a result, XLink is merely one example of how relationship data may be identified within a source resource. After server 130 parses the source resource to retrieve the relationship data from the source resource, processing proceeds to step 230.

In step 230, server 130 stores, within persistent storage 140, one or more relationship records 160 that identify the relationship described by the relationship data retrieved in step 220. A relationship record 160 may be embodied as one or more rows of one or more tables of persistent storage 140.

The information stored in the relationship record 160 in step 230 contains all the information identified in the relationship data. The information stored in a relationship record 160 may vary based upon the relationship data retrieved in step 220. For example, if the relationship data retrieved in step 220 indicated that the relationship should be modeled as a hard link or a weak link, then an object identifier that uniquely identifies the target resource is stored in the relationship record. On the other hand, if the relationship data retrieved in step 220 indicated that the relationship should be modeled as a symbolic link, then a path, within the repository 150, at which the target resource resides, is stored in the relationship record.

Additionally, since a hard link guarantees the integrity of the link, whenever a new hard link is created within the repository 150, a hard link counter value, associated with the target resource, is incremented. Similarly, whenever a resource that has a hard link to a target resource is removed, then the hard link counter value associated with the target resource is decremented. In this way, the repository 150 may monitor, for each resource in the repository, how many other resources within the repository 150, have a hard link to a particular resource. The server 130 may prevent a particular resource, stored in the repository 150, from being deleted if the hard link counter value, associated with that particular resource, has a value greater than zero.

Having described the steps of storing a source resource, the steps of storing a relationship-identifying resource shall now be described.

Storing a Relationship-Identifying Resource within the Repository

Relationship-identifying resources are particularly useful when a resource involved in the relationship cannot easily carry the relationship data. For example, a source resource may be expressed in a format that does not allow for the insertion of relationship data, such as, for example, a digital image or a resource expressed in a propriety format. In such a case, the relationship between the source resource and a target resource may still be managed by the system 100 by storing a relationship-identifying resource within repository 150 according to the steps of FIG. 2B. The steps of FIG. 2B shall be explained below with reference to FIG. 1.

Figure 2B:
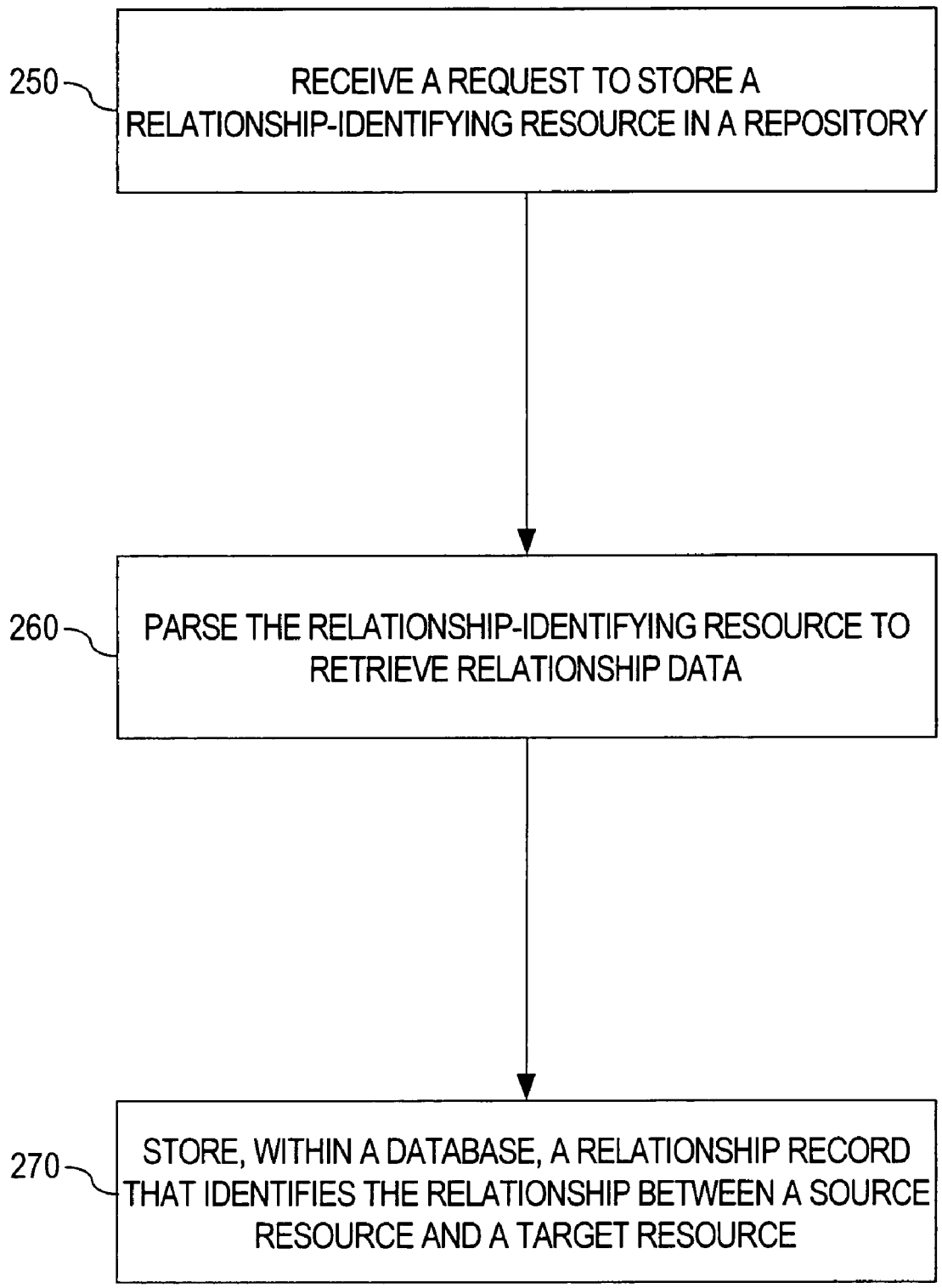
FIG. 2B is a flowchart illustrating the functional steps of storing a relationship-indentifying resource within the repository according to an embodiment of the invention.

FIG. 2B is a flowchart illustrating the functional steps of storing a relationship-identifying resource within the repository 150 according to an embodiment of the invention.

In step 250, a request to store a relationship-identifying resource in repository 150 is received by server 130. The request of step 250 may be sent by client 110 over communications link 120 to server 130. As described above, a relationship-identifying resource is a resource that contains relationship data within the resource, but is not the source resource. For example, a relationship-identifying resource may be a document that contains the relationship data expressed using XLink. After the request to store a source resource in repository 150 is received, processing proceeds to step 260.

In step 260, server 130 parses the relationship-identifying resource to retrieve relationship data. The performance of step 260 is substantially similar to that of step 220, except that the relationship data is retrieved from a relationship-identifying resource, rather than a source resource. After the relationship data is retrieved, processing proceeds to step 270.

In step 270, server 130 stores, within persistent storage 140, one or more relationship records 160 that identify the relationship between a source resource and a target resource. The performance of step 270 is substantially similar to that of step 230.

Retrieving Relationship Information from the Repository

The steps of FIG. 2A and FIG. 2B may be used to store relationship records 160 within the persistent storage 140. Once relationship records 160 are stored within persistent storage 140, a user may issue requests, to server 130, to view certain relationship records 160 that satisfy specified search criteria. A user may issue requests for information about the source resource, the target resource, link type, or any other property of the relationship that is stored in the relationship records 170. In this way, the user may view any information about the relationships between resources 170.

In an embodiment, the relationship records may be accessed using a database view. Users may issue a request, to server 130, to the database view to view certain relationship records 160 that satisfy criteria identified in the request. The database view may expose several columns, and each row of the database view may identify a particular relationship record 160. The columns of the database view may correspond to information about the various relationships between resources 170. For example, the columns of an illustrative, non-limiting database view, along with a corresponding description, are depicted below in Table 1.

TABLE 1

| Column Name | Description |
| --- | --- |
| source resource identifier | an unique identifier for the source resource |
| source path | a path to the source resource within repository 150 |
| target resource identifier | a unique identifier for the target resource |
| target path | a path to the target resource within repository 150 |
| relationship type | the type of relationship, e.g., hard link, weak link, or symbolic link |
| relationship properties | information about the properties of the relationship, e.g., if the source resource is a thumbnail image of the target resource, that information may be identified here |
| relationship-identifying resource identifier | an unique identifier for the relationship-identifying resource |
| relationship-identifying resource path | a path to the relationship-identifying resource within repository 150 |
| relationship data position data | a position of the relationship data within the resource containing it, e.g., the relationship data position may indicate a particular position within a hierarchy of XML tags within a XML document (such as /3/2/5). |

Note that many relationship records 160 may not store data for each column depicted in Table 1. For example, a relationship record 160 corresponding to hard link and a weak link may store data in the target resource identifier column, but not for the target path column; on the other hand, a relationship record 160 corresponding to a symbolic link may store data in the target path column, but not for the target resource identifier column. As a result, the type of information stored in relationship records 160 depicted in Table 1 is merely illustrative.

Configuring the Behavior of the System

The framework patent application discloses techniques for integrating logic through the use of "resource configurations." A resource configuration is a unit of logic that is associated with one or more resources within repository 150. Each resource configuration contains one or more configuration items that each defines and/or expresses one or more rules for managing a resource associated with a resource configuration.

Repository 150 interprets, evaluates, and/or analyzes a resource configuration to carry out the rules expressed therein. A resource configuration can be associated with one or more resources in various ways. For example, a resource configuration may be associated with resources that reside within a particular directory or that belong to a particular resource type. A resource that has been associated with a resource configuration is referred to herein as an associated resource.

Each time repository 150 performs an operation upon a resource, repository 150 carries out a rule specified in a resource configuration associated with the resource.

A resource configuration may be used to configure how relationship data is processed within repository 150. An exemplary schema for an element of a resource configuration is graphically depicted in FIG. 3. For example, portion 302 of the schema may be used to specify the type of link in which a relationship identified by relationship data should be modeled, e.g., a hard link, a weak link, a symbolic link, or not at all. Portion 304 of the schema may be used to specify how the location-display attribute is to be resolved when requested by client 110, e.g., if the PathFormat variable associated with a resource has a value of "identifier," then the location-display attribute is resolved upon request to the resource's identifier; on the other hand, if the PathFormat variable has a value of "path," then a resource is resolved upon request to the path, within repository 150, at which the resource resides.

The location-display attribute may be used in this way to avoid computing the path to a resource to avoid the overhead to do so when preparing information for transmittal to client 110. Thus, if so configured by the resource configuration, when a resource is retrieved from the repository 150, if the resource contains information that identifies another resource by resource identifier, then that information may be replaced with information that identifies the other resource by a path within the repository 150 at which the other resource resides. Alternately, if so configured by the resource configuration, when a resource is retrieved from the repository 150, if the resource contains information that identifies another resource by a path within the repository 150 at which the other resource resides, then that information may be replaced with information that identifies the other resource by a resource identifier.

As shown in portion 302 of the exemplary schema for a resource configuration, the resource configuration may be configured to cause system 100 to ignore relationship data contained within an associated resource. In this case, relationship records 160 are not created in persistent storage 140 when an associated source resource or a relationship-identifying resource, so configured, is stored within repository 150.

A resource configuration may specify that all associated resources exhibit a certain characteristic, e.g., all associated resources, which are source resources, shall be processed as a certain type of link (such as a symbolic link) regardless of the type of link identified in the relationship data.

In an embodiment, the configuration of the resource configuration may cause relationship data to be processed in a certain way depending upon where the relationship data is located. For example, certain types of resources may be assumed to have a certain type of link to the target resource identified within the relationship data. Further, depending on where the relationship data is located within a resource, the system 100 may make certain inferences about what type of link to make to the target resource identified within the relationship data. For example, if the relationship data is contained within the body of a web page, then the type of link identified in the corresponding relationship record 160 may be a weak link, regardless of what type of link is identified in the relationship data contained in the web page.

Implementing Mechanisms

Figure 4:
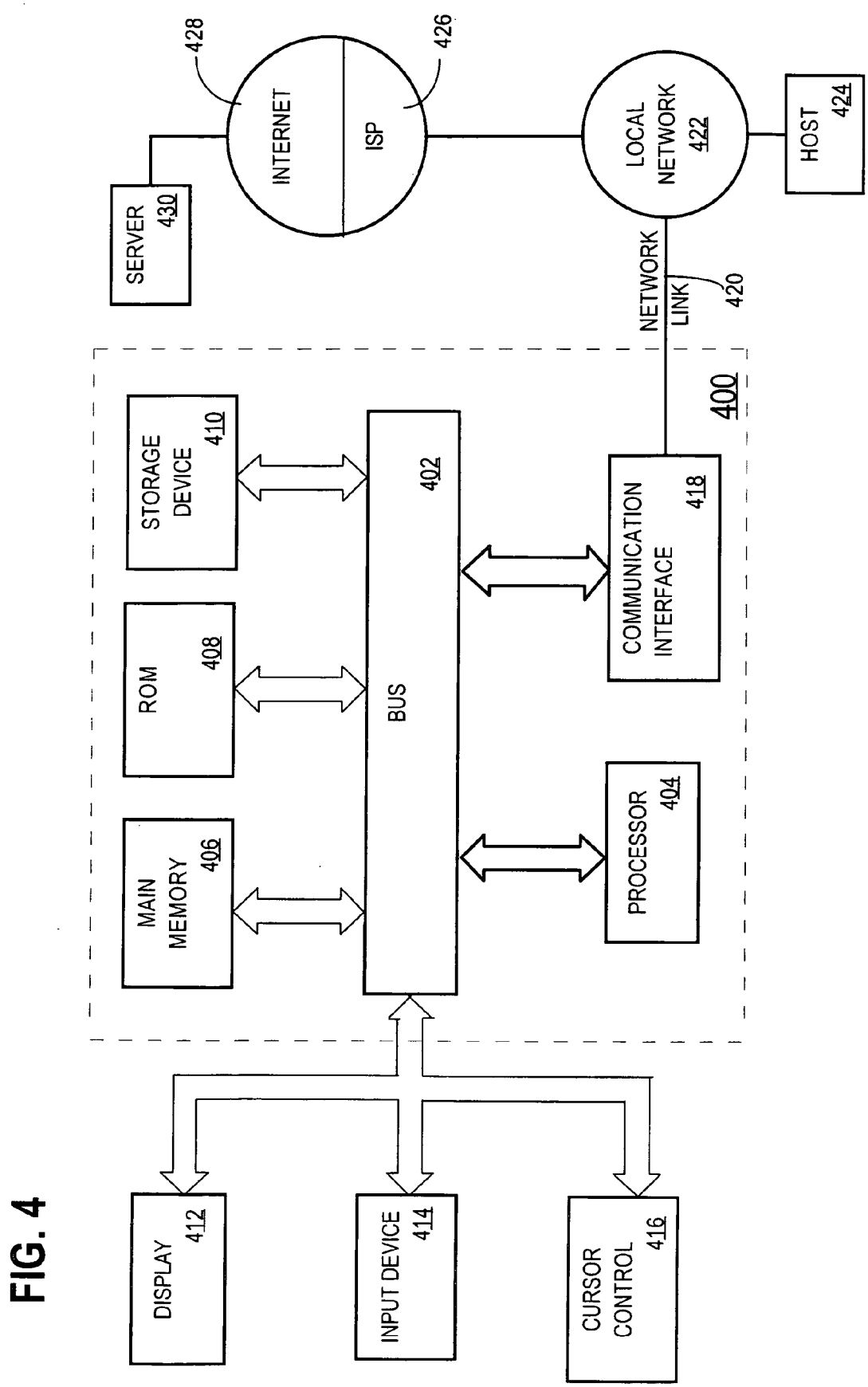
FIG. 4 is a block diagram that illustrates a computer system upon which an embodiment of the invention may be implemented.

In some embodiments, a client 110, a server 130, and persistent storage 140 may each be implemented on one or more computer systems. FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    in response to a server receiving a request to store a first resource in a repository:
        said server parsing the first resource to retrieve relationship data from within the first resource, wherein said relationship data identifies a relationship between the first resource and a second resource in the repository;
        said server determining a type of link to represent the relationship;
        said server storing, within a database, one or more relationship records that identify said relationship using the type of link between said first resource and said second resource, and
    wherein said one or more relationship records are stored separate from said first resource.

2. The method of claim 1, wherein said type of link is one of: a hard link, a weak link, and a symbolic link.

3. The method of claim 2, wherein said type of link is a hard link, and wherein said one or more relationship records identify said second resource by an object identifier assigned to said second resource by said repository.

4. The method of claim 2, wherein said type of link is a weak link, and wherein said one or more relationship records identify said second resource by an object identifier assigned to said second resource by said repository.

5. The method of claim 2, wherein said type of link is a symbolic link, and wherein said one or more relationship records identify said second resource by specifying a path, within said repository, at which said second resource resides.

6. The method of claim 1, further including:
    in response to receiving a request to delete said second resource from said repository, determining whether at least one resource, stored in said repository, has a first type of link to said second resource;
    upon determining that said at least one resource, in said repository, has a first type of link to said second resource, denying said request to delete said second resource from said repository; and
    upon determining that said at least one resource, in said repository, does not have a first type of link to said second resource, granting said request to delete said second resource from said repository.

7. The method of claim 1, wherein the one or more records identify how said relationship is to be displayed.

8. The method of claim 1, wherein said relationship is of a first type, and wherein the method further includes:
    in response to storing, within said database, said one or more relationship records, incrementing a counter associated with said second resource, wherein said counter indicates how many resources, in said repository, have a relationship of the first type within said second resource.

9. A method comprising:
    a server storing, within a repository, a first resource and a second resource, wherein said first resource does not contain any link to said second resource;
    after said server storing, within a repository, a first resource and a second resource, receiving a request to store a third resource in said repository;
    in response to said server receiving said request to store a third resource in said repository:
        said server parsing the third resource to retrieve relationship data, wherein said relationship data identifies a relationship between the first resource and said second resource;
        said server determining a type of link to represent the relationship;
        said server storing, within a database, one or more relationship records that indicate the existence of said type of link from said first resource to said second resource, and
    wherein said one or more relationship records are stored separate from either of said first resource and said second resource.

10. The method of claim 9, wherein said type of link is one of: a hard link, a weak link, and a symbolic link.

11. The method of claim 10, wherein said type of link is a hard link, and wherein said one or more relationship records identify said second resource by an object identifier assigned to said second resource by said database.

12. The method of claim 10, wherein said type of link is a weak link, and wherein said one or more relationship records identify said second resource by an object identifier assigned to said second resource by said database.

13. The method of claim 10, wherein said type of link is a symbolic link, and wherein said one or more relationship records identify said second resource by specifying a path, within said repository, at which said second resource resides.

14. The method of claim 9, the method further including:
    in response to receiving a request to delete said second resource from said repository, determining whether at least one resource, stored in said repository, has a first type of link to said second resource;
    upon determining that said at least one resource, in said repository, has a first type of link to said second resource, denying said request to delete said second resource from said repository; and
    upon determining that said at least one resource, in said repository, does not have a first type of link to said second resource, granting said request to delete said second resource from said repository.

15. The method of claim 9, wherein the one or more records identify how said relationship is to be displayed.

16. The method of claim 9, wherein said relationship is of a first type, and the method further including:
    incrementing a counter associated with said second resource, wherein said counter indicates how many resources, in said repository, have a relationship of the first type with said second resource.

17. A non-transitory computer-readable volatile or non-volatile storage medium storing one or more sequences of instructions which, when executed by one or more processors, causes the one or more processors to perform a method, comprising:

in response to a server receiving a request to store a first resource in a repository:
  said server parsing the first resource to retrieve relationship data from within the first resource, wherein said relationship data identifies a relationship between the first resource and a second resource in the repository;
  said server determining a type of link to represent the relationship;
  said server storing, within a database, one or more relationship records that identify said relationship using the type of link between said first resource and said second resource, and
wherein said one or more relationship records are stored separate from said first resource.

18. The non-transitory computer-readable volatile or non-volatile storage medium of claim 17, wherein said type of link is one of: a hard link, a weak link, and a symbolic link.

19. The non-transitory computer-readable volatile or non-volatile storage medium of claim 18, wherein said type of link is a hard link, and wherein said one or more relationship records identify said second resource by an object identifier assigned to said resource by said repository.

20. The non-transitory computer-readable volatile or non-volatile storage medium of claim 18, wherein said type of link is a weak link, and wherein said one or more relationship records identify said second resource by an object identifier assigned to said second resource by said repository.

21. The non-transitory computer-readable volatile or non-volatile storage medium of claim 18, wherein said type of link is a symbolic link, and wherein said one or more relationship records identify said second resource by specifying a path, within said repository, at which said second resource resides.

22. The non-transitory computer-readable volatile or non-volatile storage medium of claim 18, further including:
  in response to receiving a request to delete said second resource from said repository, determining whether at least one resource, stored in said repository, has a first type of link to said second resource;
  upon determining that said at least one resource, in said repository, has a first type of link to said second resource, denying said request to delete said second resource from said repository; and
  upon determining that said at least one resource, in said repository, does not have a first type of link to said second resource, granting said request to delete said second resource from said repository.

23. The non-transitory computer-readable volatile or non-volatile storage medium of claim 17, wherein the one or more records identify how said relationship is to be displayed.

24. The non-transitory computer-readable volatile or non-volatile storage medium of claim 17, wherein said relationship is of a first type, and wherein the method further includes:
  in response to storing, within said database, said one or more relationship records, incrementing a counter associated with said second resource, wherein said counter indicates how many resources, in said repository, have a relationship of the first type within said second resource.

25. A non-transitory computer-readable volatile or non-volatile storage medium storing one or more sequences of instructions which, when executed by one or more processors, causes the one or more processors to perform a method comprising:
  a server storing, within a repository, a first resource and a second resource, wherein said first resource does not contain any link to said second resource;
  after said server storing, within a repository, a first resource and a second resource, receiving a request to store a third resource in said repository;
  in response to said server receiving said request to store a third resource in said repository:
    said server parsing the third resource to retrieve relationship data, wherein said relationship data identifies a relationship between the first resource and said second resource;
    said server determining a type of link to represent the relationship;
    said server storing, within a database, one or more relationship records that indicate the existence of said type of link from said first resource to said second resource, and
  wherein said one or more relationship records are stored separate from either of said first resource and said second resource.

26. The non-transitory computer-readable volatile or non-volatile storage medium of claim 25, wherein said type of link is one of: a hard link, a weak link, and a symbolic link.

27. The non-transitory computer-readable volatile or non-volatile storage medium of claim 26, wherein said type of link is a hard link, and wherein said one or more relationship records identify said second resource by an object identifier assigned to said second resource by said database.

28. The non-transitory computer-readable volatile or non-volatile storage medium of claim 26, wherein said type of link is a weak link, and wherein said one or more relationship records identify said second resource by an object identifier assigned to said second resource by said database.

29. The non-transitory computer-readable volatile or non-volatile storage medium of claim 26, wherein said type of link is a symbolic link, and wherein said one or more relationship records identify said second resource by specifying a path, within said repository, at which said second resource resides.

30. The non-transitory computer-readable volatile or non-volatile storage medium of claim 25, the method further including:
  in response to receiving a request to delete said second resource from said repository, determining whether at least one resource, stored in said repository, has a first type of link to said second resource;
  upon determining that said at least one resource, in said repository, has a first type of link to said second resource, denying said request to delete said second resource from said repository; and
  upon determining that said at least one resource, in said repository, does not have a first type of link to said second resource, granting said request to delete said second resource from said repository.

31. The non-transitory computer-readable volatile or non-volatile storage medium of claim 26, wherein the one or more records identify how said relationship is to be displayed.

32. The non-transitory computer-readable volatile or non-volatile storage medium of claim 25, wherein said relationship is of a first type, and wherein said instructions, when executed by said one or more processors, further cause:
  incrementing a counter associated with said second resource, wherein said counter indicates how many resources, in said repository, have a relationship of the first type with said second resource.

* * * * *

UNITED STATES PATENT AND TRADEMARK OFFICE
CERTIFICATE OF CORRECTION

PATENT NO. : 8,356,053 B2
APPLICATION NO. : 11/256527
DATED : January 15, 2013
INVENTOR(S) : Murthy et al.

It is certified that error appears in the above-identified patent and that said Letters Patent is hereby corrected as shown below:

On Title page 3, in column 1, under Item (56) "Other Publications", line 9, delete "{shklar/www11" and insert -- shklar/www11 --, therefor.

On Title page 3, in column 1, under Item (56) "Other Publications", line 31, delete "Itnplementation" and insert -- Implementation --, therefor.

On Title page 3, in column 2, under Item (56) "Other Publications", line 11, delete "Tannebaum"," and insert -- Tannenbaum", --, therefor.

On Title page 3, in column 2, under Item (56) "Other Publications", line 21, delete "MacMillian" and insert -- MacMillan --, therefor.

In the Specifications

In column 2, line 9, delete "relationship-indentifying" and insert -- relationship-identifying --, therefor.

In the Claims

In column 15, line 22, in Claim 19, delete "resource" and insert -- second resource --, therefor.

In column 15, line 62, in Claim 25, delete "method" and insert -- method, --, therefor.

Signed and Sealed this
Ninth Day of April, 2013

Teresa Stanek Rea
*Acting Director of the United States Patent and Trademark Office*